US011858232B1

(12) United States Patent
Chan

(10) Patent No.: US 11,858,232 B1
(45) Date of Patent: Jan. 2, 2024

(54) MODULAR DUNNAGE MACHINE

(71) Applicant: Nuevopak Technology Company Limited, Kowloon (HK)

(72) Inventor: Simon C. S. Chan, Hong Kong (HK)

(73) Assignee: INTERTAPE POLYMER CORP., Sarasota, FL (US)

( * ) Notice: Subject to any disclaimer, the term of this patent is extended or adjusted under 35 U.S.C. 154(b) by 420 days.

(21) Appl. No.: 15/471,570

(22) Filed: Mar. 28, 2017

Related U.S. Application Data

(60) Provisional application No. 62/314,384, filed on Mar. 28, 2016.

(51) Int. Cl.
*B31D 5/00* (2017.01)

(52) U.S. Cl.
CPC .... *B31D 5/0047* (2013.01); *B31D 2205/0058* (2013.01); *B31D 2205/0082* (2013.01)

(58) Field of Classification Search
CPC .......... B31D 5/0047; B31D 2205/0058; B31D 2205/0082
USPC ................................ 493/352, 350, 904, 967
See application file for complete search history.

(56) References Cited

U.S. PATENT DOCUMENTS

| | | | | |
|---|---|---|---|---|
| 6,076,764 | A * | 6/2000 | Robinson | B26D 7/24 242/571.5 |
| 6,676,589 | B2 * | 1/2004 | Kung | B31D 5/0047 493/464 |
| 7,722,519 | B2 * | 5/2010 | Timmers | B31D 5/0047 493/352 |
| 8,419,606 | B2 * | 4/2013 | Carlson | B31D 5/0047 493/464 |
| 9,321,235 | B2 * | 4/2016 | Cheich | B31D 5/0047 |
| 9,533,465 | B2 * | 1/2017 | Lintala | B31D 5/0047 |
| 9,914,279 | B2 * | 3/2018 | Van der Kaap | B31D 5/0039 |
| 2009/0258775 | A1 * | 10/2009 | Chan | B31D 5/0047 493/464 |
| 2011/0281711 | A1 * | 11/2011 | Chan | B31D 5/0047 493/464 |

* cited by examiner

*Primary Examiner* — Sameh Tawfik
(74) *Attorney, Agent, or Firm* — K&L Gates LLP

(57) ABSTRACT

A modular dunnage machine assembly consists essentially of discrete modules of grouped dunnage machine components, the dunnage assembly being usable for expanding, stitching and/or compressing and/or pulling, and cutting, sheet stock material into separate strips of dunnage or other cushioning product. The modules can be individually mounted to the assembly and stabilized thereon, before being securely connected to the assembly, for purposes of component part replacement or initially assembly. In some embodiments, the modules consist essentially of a gear and motor module, an expander module, a power supply module, an internal mounting frame module and a cutter module.

9 Claims, 11 Drawing Sheets

MODULAR DUNNAGE MACHINE

CROSS REFERENCE TO RELATED APPLICATION(S)

This application claims the benefit of U.S. Provisional Patent Application Ser. No. 62/314,384, filed on Mar. 28, 2016, which is incorporated herein by reference in its entirety.

BACKGROUND

1. Technical Field

The present disclosure relates to dunnage machine assemblies for generating cushioning material, and in particular, to dunnage machine assemblies with modular components and methods for assembly thereof.

2. Description of Related Art

U.S. Pat. Nos. 8,501,302 and 8,708,882 show example prior art dunnage systems, which are helpful for providing context for understanding the present disclosure, both of which are incorporated herein by reference in their entireties.

Many commercially available dunnage machines that are currently available on the market tend to be large and heavy. Shipping entire dunnage machines for repair is labor intensive and/or expensive. Also, dunnage machine parts are often complicated to repair or to remove for repair/replacement. As a result, maintenance is often difficult, complicated, and expensive.

BRIEF SUMMARY

In some embodiments, a dunnage machine assembly is provided in discrete modules that, when assembled together, include all components necessary to expand sheet stock material and process the sheet stock material to form cushioning material or dunnage. The discrete modules can consist essentially of an internal mounting frame module, electronic control/power supply (E-box) module, gear and motor module, cutter module, and expander module. Thus, in such embodiments, the entire dunnage machine assembly exhibits traits of portability with easy assembly and disassembly for any component of the dunnage machine that may need repair and/or replacement. That is, for example, a repair or replacement of any component of the dunnage assembly may comprise simply removing the module within which a component is contained, and repairing the component or shipping the particular module away for repair, while replacing the module with a replacement module in operative condition. The replacement module may be held in inventory so that there is no delay in repair.

Despite the benefits of providing discrete modules to house various components of the dunnage assembly, handling of each of the discrete modules by, for example, a single individual may be difficult due to their size and weight (e.g., a motor combined with the moveable components that it drives). However, various methods and structures of the present disclosure are provided to aid a user in removing and/or mounting and connecting the modules together. For example, in some embodiments, the gear and motor module as referenced above may be mounted on the internal frame module by being hung on the internal frame module in stable position, then a user may securely fasten the gear and motor module to the internal frame module without otherwise having to stabilize the module while fastening. As such, in some embodiments, a single individual may be able to efficiently replace modules, or otherwise assemble them together, with relative ease.

DETAILED DESCRIPTION

In the present description, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures and materials of construction have not been described in detail to avoid unnecessarily obscuring the descriptions of the embodiments of the disclosure.

In the present disclosure, to the extent the terms "about" and "approximately," are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, and these terms and their variants are intended to be construed as non-limiting. The definitions in this paragraph are intended to apply throughout this disclosure unless otherwise expressly stated.

In some embodiments of the present disclosure, a dunnage machine is provided that includes modules that can easily be assembled together, as well as disassembled, even by a single individual. Each of the module can be individually fabricated, repaired, tested, assembled, and "connected" to other modules of the dunnage machine.

Figure 1:
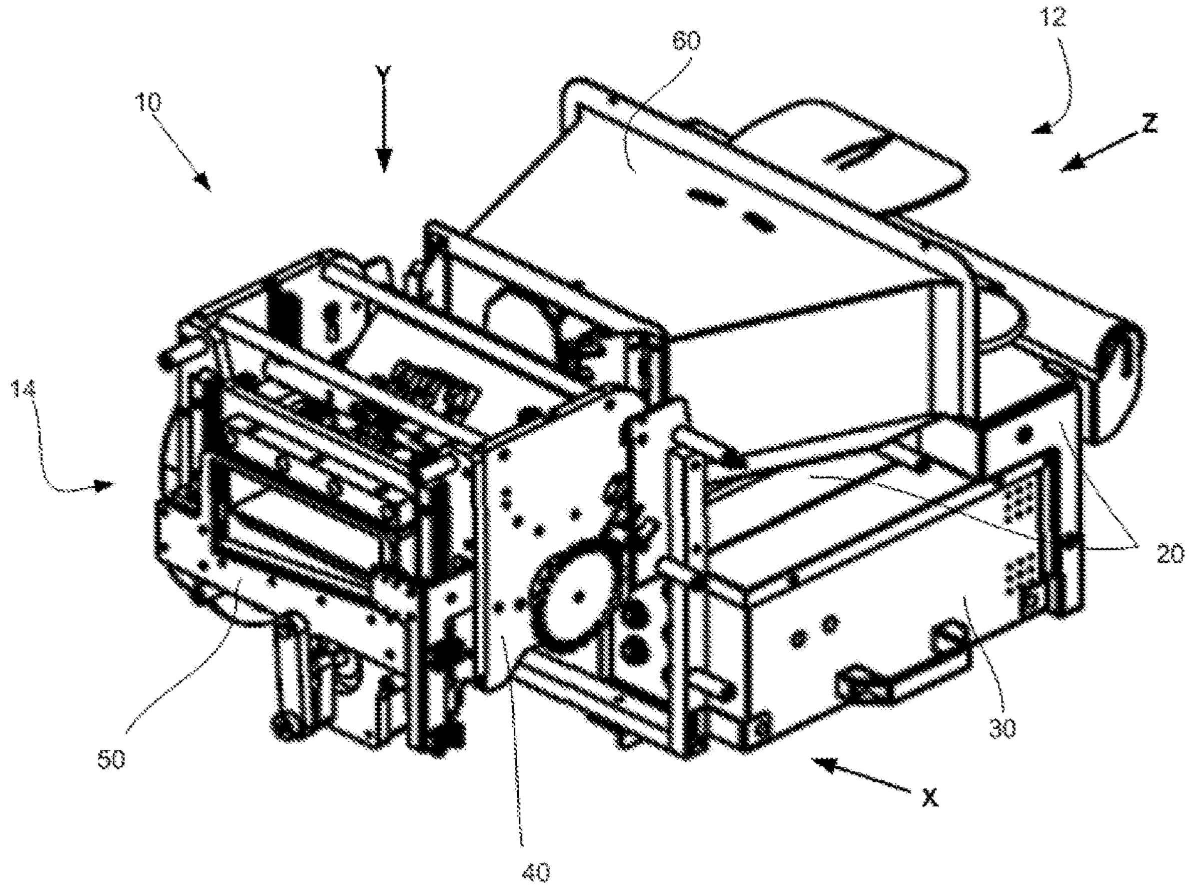
FIG. 1 is a perspective view of an internal assembly of a dunnage machine for some embodiments of the present disclosure.

FIG. 1 illustrates a perspective view of internal assembly 10 of a dunnage machine that includes modules that can be easily assembled together. For illustrative purposes, the internal assembly 10 is shown without external housing (see FIGS. 10A & 10B, which illustrates the corresponding dunnage machine with external housing). The internal assembly 10 includes an internal mounting frame module 20, a power supply electronic box ("E-box") module 30, a gear and motor module 40, a cutter module 50, and an expander module 60.

In various embodiments, each of these modules may be easily connected together when the internal assembly 10 is being assembled, either initially, or for parts replacement. When the internal assembly 10 needs to be repaired or parts need to be replaced, the internal assembly 10 may be disassembled by, for example, disconnecting (e.g., unscrewing various screws) and pulling apart the various modules as needed.

The internal assembly 10 includes a rear section 12, which is the rear of the internal assembly 10 facing a direction from which sheet material may be fed into the internal assembly 10 via the expander forming module 60. Opposite from the rear section 12 is a forward (or front) section 14 facing a direction in which cushioning material may be outputted from the internal assembly 10 through cutter module 50. Note that the internal mounting frame module, E-box module, expander module, gear and motor module, and cutter module, each may be described as having a rear section 12 and a forward (or front) section 14.

Note that for ease of illustration and explanation, various relative spatial terms such as "longitudinal," "lateral," "vertical," "top," and "bottom" may be used in the following description. Unless the context expressly indicates otherwise, the term "longitudinal" as used herein refers to an axis running generally parallel to the line that forms arrow "Z" in FIG. 1. Thus, a sheet material may be initially fed and processed through the internal assembly 10 along a longitudinal path (e.g., having a component of travel in a direction parallel with arrow "Z"). Unless the context expressly indicates otherwise, the term "lateral" as used herein refers to an axis that is parallel to the line that forms arrow "X" and that runs generally horizontal and perpendicular to the longitudinal axis of FIG. 1. In contrast, unless the context expressly indicates otherwise, "vertical" as used herein can refer to an axis that is parallel to the line that forms arrow "Y" and that runs generally vertically perpendicular to both the longitudinal axis and the lateral axis, relative to the internally assembly 10 as illustrated in FIG. 1. The internal assembly 10 illustrated in FIG. 1 is depicted in an upright orientation (e.g., the orientation of the internal assembly 10 when the internal assembly 10 is operational). Thus, the terms "top" and "bottom" to be used herein will be respect to the specific orientations of the various components of the internal assembly 10 as illustrated in FIG. 1.

Figure 2A:
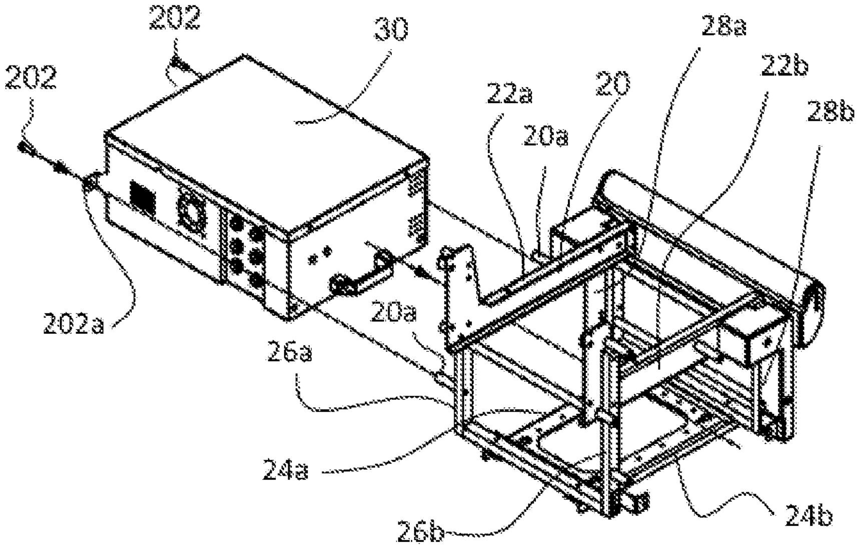
FIG. 2A illustrates a power supply, or electronic box ("E-box") module being inserted into an internal mounting frame module in the dunnage machine of FIG. 1.
Figure 2B:
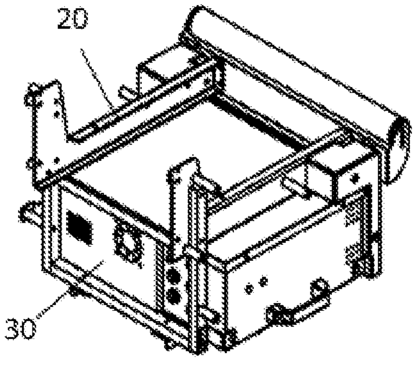
FIG. 2B illustrates the E-box module of FIG. 2A having been inserted into the internal mounting frame module of FIG. 2A.

FIG. 2A shows the internal mounting frame module 20 in stand-alone state, and also illustrates generally a sliding direction for the E-box module 30 of FIG. 1 to be connected to the internal mounting frame module 20 of FIG. 1. In particular, for example, when the internal assembly 10 of FIG. 1 is being assembled, the E-box module 30 may be slid into the internal mounting frame module 30 as illustrated in FIG. 2A, between the internal mounting frame module's upper longitudinal parallel frame members 22*a* & 22*b*, and lower longitudinal parallel frame members 24*a* & 24*b*, and between its front vertical parallel frame members 26*a* & 26*b* and rear vertical parallel frame members 28*a* & 28*b*. In various embodiments, the internal mounting frame module 20 may be the supporting structure for the other modules described herein. Once the E-box module 30 has been slidably inserted within (e.g., mounted to) the internal mounting frame module 20, the E-box module 30 may be securely connected to the internal mounting frame module 20 by fastening members (e.g., screws) 202. FIG. 2B illustrates the E-box module 30 and the internal mounting frame module 20 when the E-box module 30 has been successfully mounted to the internal mounting frame module 20, with fastening members 202 having been inserted through aperture tabs 202*a* on the E-Box, and into fastening receivers 20*a* on the internal mounting frame 20.

The E-box module 30 may include various electronics for controlling and/or for providing power to various motors (e.g., electric motors for the cutter module 50 and the gear and motor module 40) that may be included in the internal assembly 10. The electronic components of the E-box module 30 may be covered and protected by an external housing of the E-box module 30.

Figures 3A, 3B:
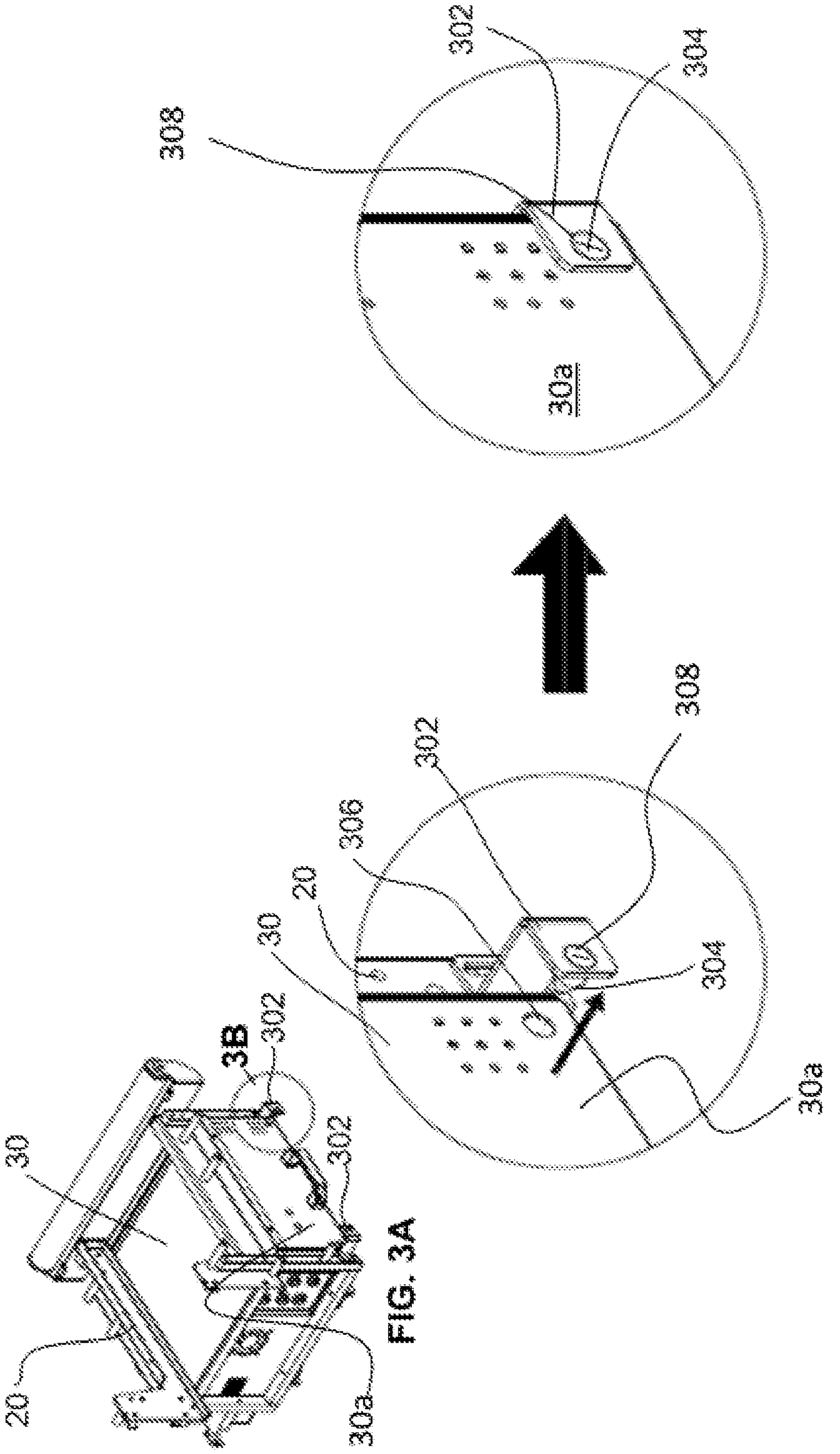
FIG. 3A is a perspective view of the E-box module and the internal mounting frame module of FIG. 2B, including a marked circular boundary of the region depicted in the enlarged views in FIG. 3B.
FIG. 3B includes two enlarged perspective views showing motion of the E-box module relative to the internal mounting frame module as the E-box module is being inserted into the internal mounting frame module.

FIG. 3A substantially mirrors FIG. 2B and shows portions of a substantially similar E-Box module 30 and internal mounting frame module 20, such as depicted in FIGS. 2A and 2B. Moreover, referring to FIG. 3B, when the E-box module 30 is fully inserted into the internal mounting frame module 20, after having been slid into the internal mounting frame module 20 from its right side to its left side, a left side portion 30*a* of the E-box module 30 can abut against attachment tabs 302, located on a left side of the internal mount frame module 20. The attachment tabs 302 can each include an aperture 308 that aligns with a corresponding aperture 306 on the E-box module, and thereafter, fastening members (e.g., pins or screws) 304 can be inserted through the respective apertures, 306, 308, to further securely connect the E-box module to the internal mounting frame module 30, as will be appreciated by those skilled in the art after reviewing the present disclosure.

Figure 4A:
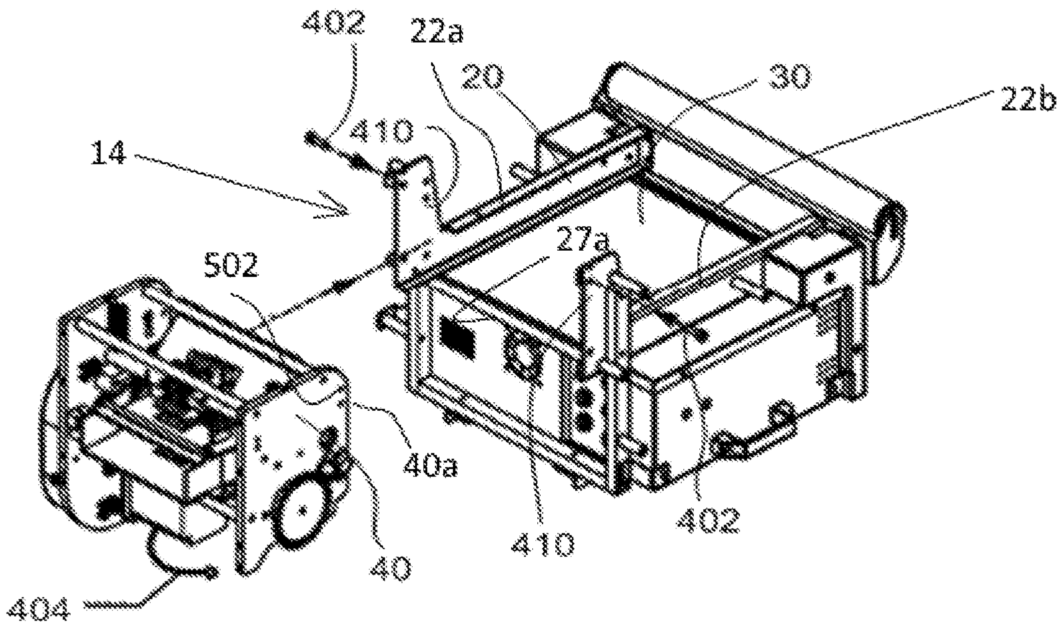
FIG. 4A is a perspective view illustrating a gear and motor module being mounted onto the internal mounting frame module for some embodiments of the present disclosure.

Referring to FIG. 4A, the gear and motor module 40 may be connected to the internal mounting frame module 20 according to various embodiments. In some embodiments, the gear and motor module 40 may be connected to the internal mounting frame module 20 by mounting (e.g., lifting and setting down) the gear and motor module 40 onto the front section 14 of the internal mounting frame module 20 (see also FIG. 5B). In particular, the gear and motor module 40 may be placed onto and between two mounting fins 410 of the internal mounting frame module 20. The two mounting fins 410 may be formed or disposed on a top portion of the internal mounting frame module 20 and on the front section 14 of the internal mounting frame module 20.

Figure 4B:
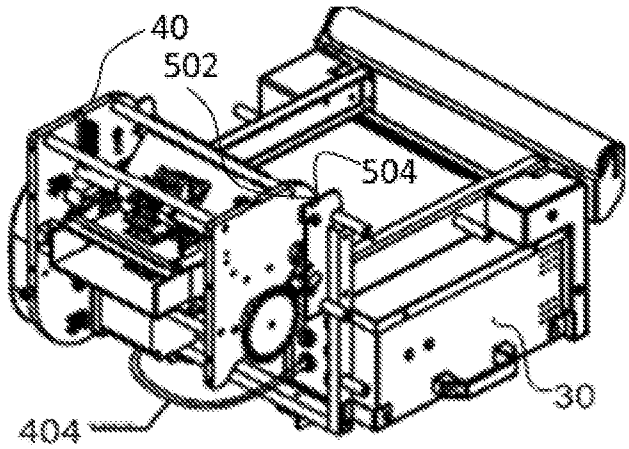
FIG. 4B illustrates the gear and motor module mounted on the internal mounting frame module of FIG. 4A.

The two mounting fins 410 each have a top end and a bottom end that is opposite of the top end, the bottom ends of the two mounting fins 410 being attached to, or formed on, respective upper parallel longitudinal frame members 22*a*, 22*b* of the internal mounting frame module 20, projecting upwards therefrom. In some embodiments, one or more cables 404 may hang from the bottom of the gear and motor module 40 for controlling and/or providing electric power to the gear and motor module 40. Once the gear and motor module 40 is mounted to the internal mounting frame module 20, as illustrated in FIG. 4B, the gear and motor module 40 may be secured to the internal mounting frame module 20 with fastening members (e.g., screws) 402, that may be threaded (or otherwise connected) through respective aligned apertures 506, 508 (see FIG. 5B) disposed in mounting fins 410 of the internal mounting frame module 20 and the gear and motor module 40. As illustrated in FIG. 4B, a cable 404 may be plugged into, or connected to, the E-box module 30

In various embodiments, the gear and motor module 40 may be configured to pull sheet material that is fed into and passes through the expander module 60. In various embodiments, the gear and motor module 40 may further be designed to compress, or stitch, at least a portion (e.g., a longitudinal portion or strip) of sheet material outputted by the expander forming module 60, as will be appreciated by those skilled in the art after reviewing this disclosure.

Figures 5A, 5B:
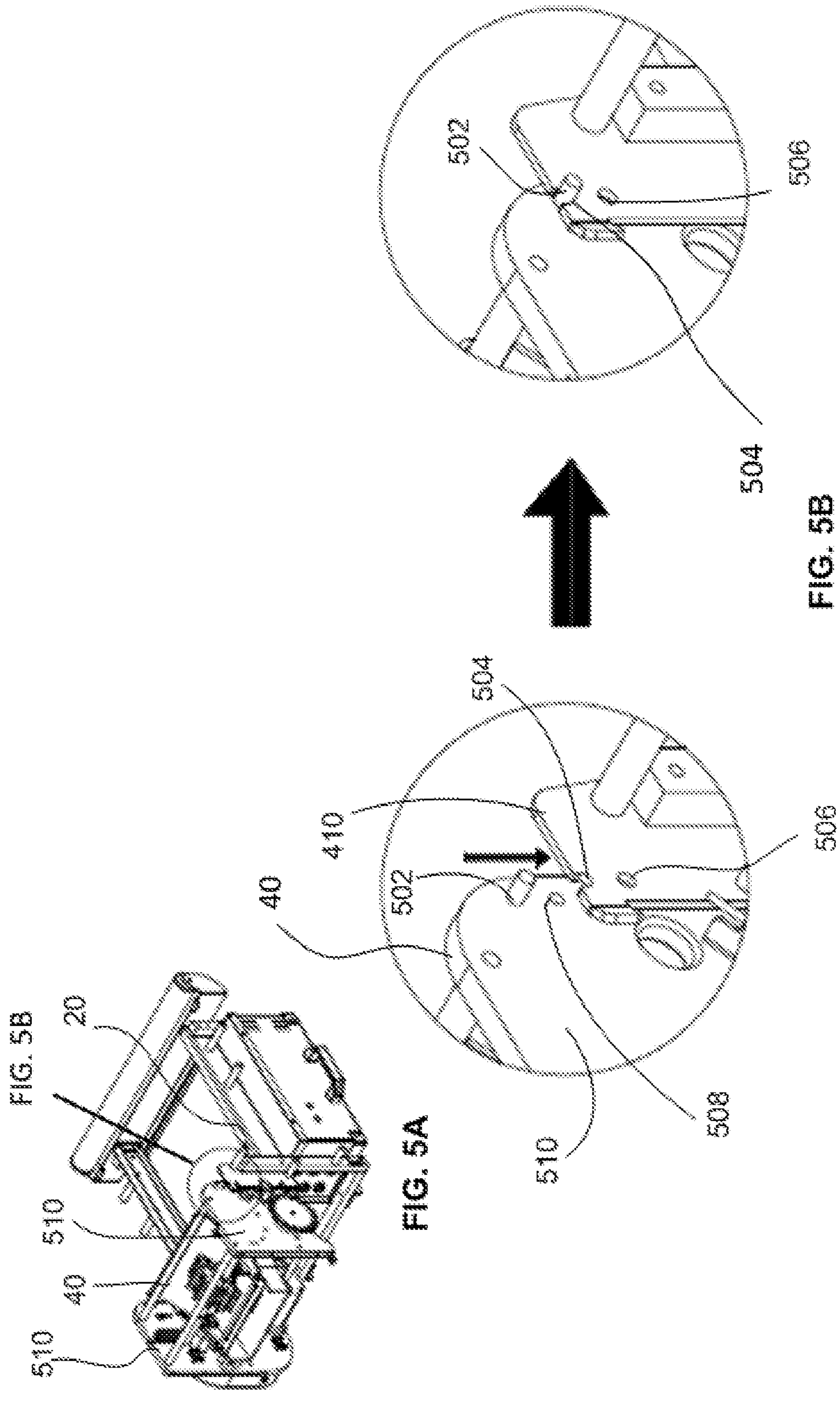
FIG. 5A shows a perspective view of the gear and motor module of FIG. 4B, and further including a circle marking the boundary of the region depicted in the enlarged views in FIG. 5B.
FIG. 5B includes two enlarged perspective views showing motion of the gear and motor module relative to the internal mounting frame module as the gear and motor module is being mounted to the internal mounting frame module.

FIG. 5A substantially mirrors FIG. 4B, including illustrating a boundary of the enlarged region depicted in FIG. 5B. Referring to FIG. 5B, the gear and motor module 40 can include a pair of opposite mounting sidewalls 510, defining outer left and outer right perimeter portions of the gear and motor module 40, except for holding studs 502 which extend laterally further than the opposite mounting sidewalls 510, with each mounting sidewall 510 having a laterally outwardly protruding holding stud 502. Also, a corresponding holding notch 504 may be provided at a top portion of each mounting fin 410 of the internal mounting frame module 20. The opposite mounting sidewalls 510 can be configured such that the gear and motor module 40 can be partially inserted between the mounting fins 410 with at least a portion of the mounting sidewalls 510 being aligned laterally inward of the mounting fins 410. In some embodiments, opposite inward faces of the mounting fins 410 may be spaced apart by approximately 6 inches to 20 inches, which may also approximate a lateral width of the internal frame module in some embodiments of the present disclosure. In some embodiments, a clearance between outer faces of the opposite mounting sidewalls and each corresponding mounting fin 410 may be about 0.01 cm to 1 cm. Moreover, the holding studs 502 can be formed, or attached, near a top portion of the mounting sidewalls 510. As such, in some embodiments, a user can lift the gear and motor module 40 onto the mounting fins 410 and deposit the holding studs 502 of the gear and motor module 40 into the corresponding holding notches 504 of the internal mounting frame module 20 to mount the entire gear and motor module 40 in position aligned with the mounting fins 410 of the internal mounting frame module 20. In some embodiments, once the holding studs 502 are deposited into holding notches 504, the gear and motor module 40 can hang on the holding notches 504, and a rear portion 40*a* of the gear and motor module 40, below the holding studs 502, can abut against an upper front lateral frame member 27*a* of the internal mounting frame module 40. See, e.g., FIG. 4A. In some embodiments, this can "stop" the gear and motor module 40 from pivoting rearward about the holding studs 502 past the lateral frame member 27*a* as it "hangs" in the holding notches 504, since the holding studs 502 may be positioned rearward of a center-of-mass of the gear and motor module 40.

Similarly, in some embodiments, disposed just below each holding stud 502 of each mounting sidewall 510 is a corresponding fastening member aperture 508 that aligns with a corresponding aperture 506 of the mounting fins 410 when the holding stud 502 is deposited/sits in the holding notch 504, and a rear portion 40*a* of the gear and motor module 40 abuts against the internal mounting frame 40 (e.g., a lateral frame member 27*a* thereof). When corresponding apertures 508, 506 are aligned a fastening member 402 (e.g., screw) may be threaded, or otherwise coupled, through the apertures to securely connect the gear and motor module 40 to the internal mounting frame module 30.

The holding notch 504 and the holding stud 502 described above may prove to be particularly useful when, for example, only a single individual is securing the gear and motor module 40 onto the internal mounting frame module 20, or removing the gear and motor module 40 therefrom. That is, the gear and motor module 40, which may include a motor for driving the various mechanical components (e.g., gears and forming members) of the gear and motor module 40, may be relatively heavy. However, by simply depositing the holding studs 502 of the gear and motor module 40 into the holding notches 504 of the internal mounting frame module 20, a single individual user may hang the gear and motor module 40 before adjusting (inserting) the fastening members 402 to connect the gear and motor module 40 to the internal mounting frame module 20, and conversely, when the user is removing the gear and motor module 40, the fastening members 402 may be removed completely before handling the heavy module (e.g., lifting it from its hanging position on the holding notches 504), as will be appreciated by those skilled in the art after reviewing the present disclosure.

Figure 6B:
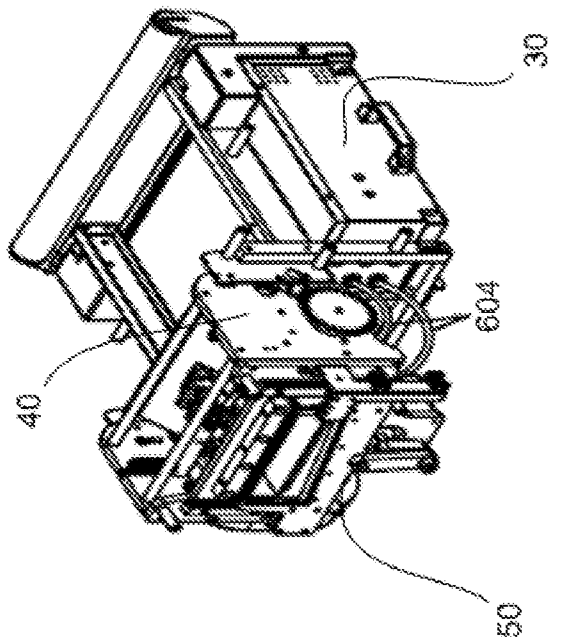
FIG. 6B illustrates the cutter module mounted on the gear and motor module of FIG. 6B.
Figure 6A:
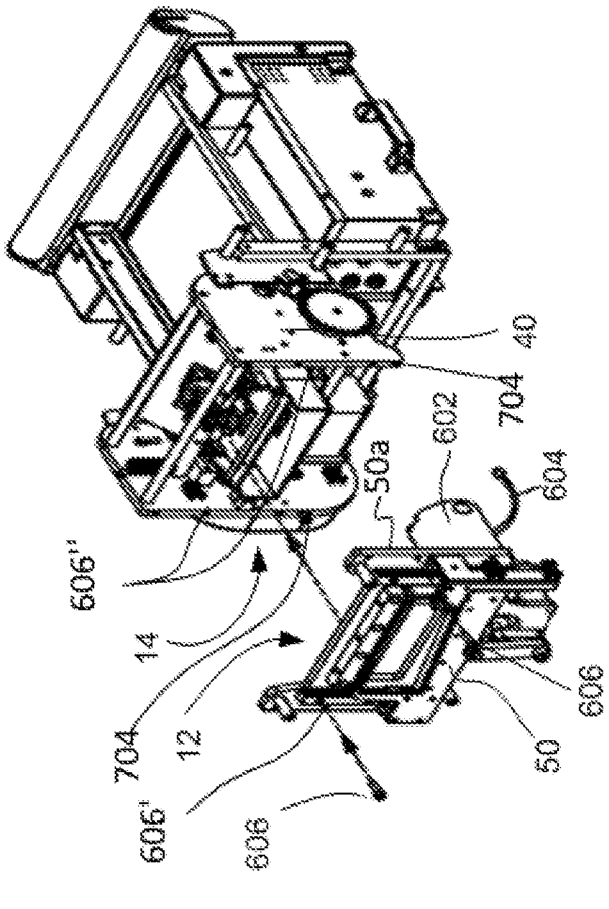
FIG. 6A is a perspective view illustrating a cutter module being mounted onto the gear and motor module for some embodiments of the present disclosure.

Referring to FIG. 6A, a cutter module 50 may be connected to other portions of the internal assembly 10, such as, for example, by attaching it to the gear and motor module 40, according to various embodiments. As will be appreciated by those skilled in the art after reviewing the present disclosure, the cutter module 50 may be provided to automatically cut cushioning material (e.g. crumpled sheet material, or dunnage) outputted by the gear and motor module 40 to form discrete strips of dunnage. In some embodiments, the cutter module 50 may include one or more cutting components such as one or more blades (not explicitly shown), a motor 602, and one or more cables 604 for providing control and/or power to the motor 602. When the cutter module 50 is successfully mounted to a front section 14 of the gear and motor module 40, two or more fastening members (e.g., screws) 606 may be used to securely connect the cutter module 50 to the gear and motor module 40. When the cutter module 50 is connected to the gear and motor module 40, the one or more cables 604 may be plugged or connected to the E-box 30 as illustrated in FIG. 6B.

Figure 7A:
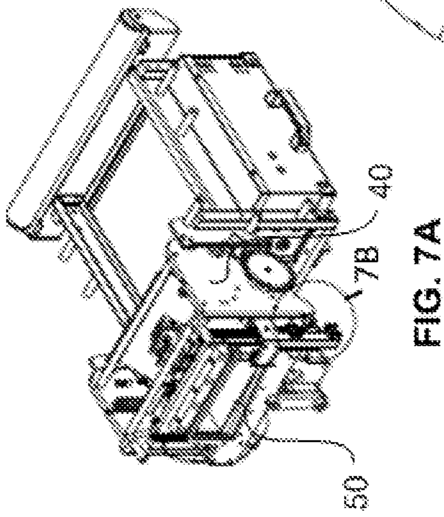
FIG. 7A shows a perspective view of the cutter module as mounted in FIG. 6A, including a boundary of the region depicted in the enlarged views in FIG. 7B.
Figure 7B:
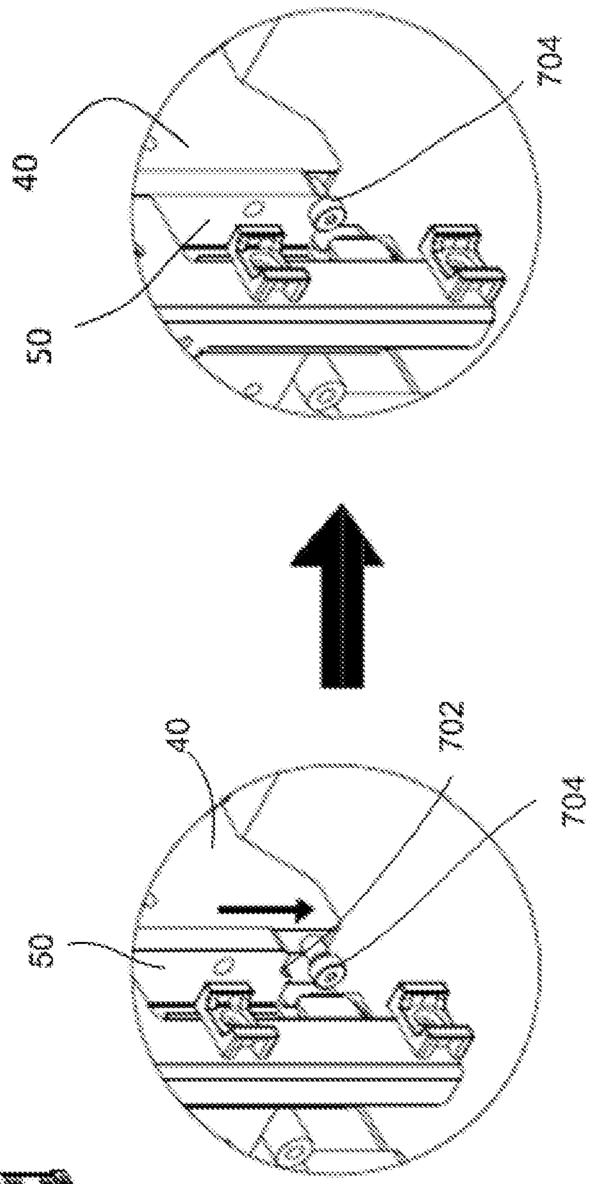
FIG. 7B includes two enlarged perspective views showing motion of the cutter module relative to the gear and motor module as the cutter module is being mounted to the gear and motor module.

FIG. 7A substantially mirrors FIG. 6B and includes an indication of a boundary region circle showing the location of the enlarged views in FIG. 7B. Referring to FIGS. 6A and 7B, when a rear face 50*a* of the cutter module 50 is mated with a front section 14 of the gear and motor module 40, it can be mated above left and right side stopping studs 704 on the gear and motor module 40, and then slid downward until it abuts against the stopping studs 704, each stopping stud 704 protruding rearwardly from the front section 14 of the gear and motor module 40. In particular, at the bottom portion of the front section 14 of the gear and motor module 40 are at least two protruding stopping studs 704 (one of which is shown in FIG. 7B). Conversely, at a bottom portion of the rear face 50*a* (see FIGS. 6A and 7B) of the cutter module 50 are left and right holding notches 702, configured to rest on the stopping studs 704 when the cutter module 50 is aligned with the gear and motor module 40 for connection. Once the left and right holding notches 702 are resting on the left and right stopping studs 704, the mounted cutter module 50 may be securely connected to the gear and motor module 40 using fastening members (e.g., screws) 606, as will be appreciated by those skilled in the art after reviewing this disclosure.

In various embodiments, the holding notches 702 of the cutter module 50 and the stopping studs 704 of the gear and motor module 40 may be particularly useful for mounting and securing the cutter module 50 to the gear and motor module 40. In particular, the holding notches 702 and the stopping studs 704 may be used to properly align the cutter module 50 with the gear and motor module 40 so that the fastening members 606 used to secure the cutter module 50 to the gear and motor module 40 may be aligned with corresponding holes (606', 606") disposed on the cutter module 50 and the gear and motor module 40. Moreover, in some embodiments, after a user aligns the cutter module 50 with the gear and motor module 40, and rests the holding notches 702 on the stopping studs 704, the cutter module 50 can rest in alignment (be mounted) without a user holding the cutter module 50 against the gear and motor module 40, and the user's hands may be free to apply the fastening members 606 to secure the cutter module 50. Alternatively, the user can use a single hand to press the cutter module 50 against the gear and motor module 40 with the modules aligned, and then apply the fastening members 606.

Figure 8B:
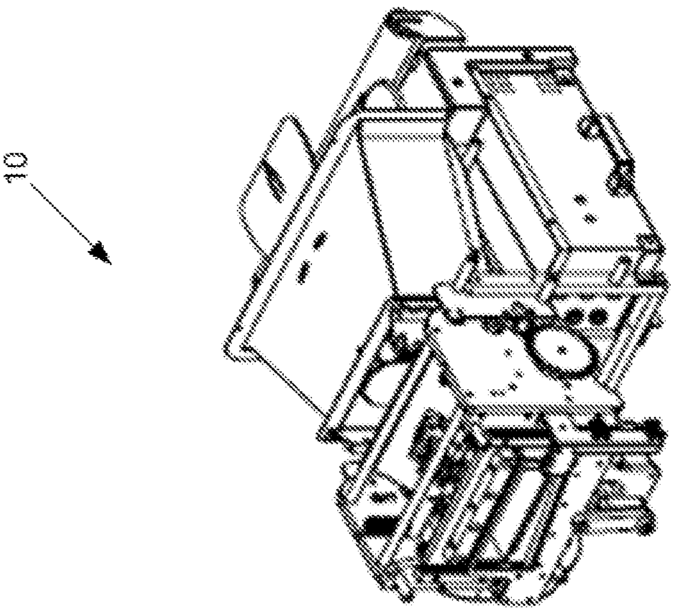
FIG. 8B illustrates the expander module mounted on the internal mounting frame module of FIG. 8A.
Figure 8A:
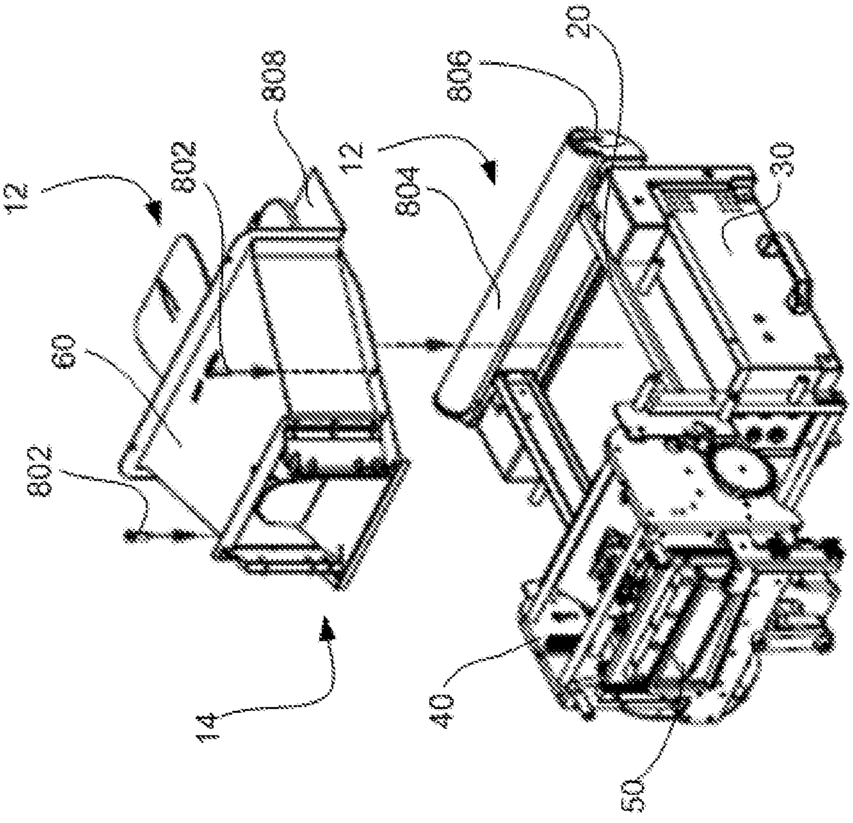
FIG. 8A is a perspective view illustrating an expander module being mounted onto the internal mounting frame module for some embodiments of the present disclosure.

Referring to FIGS. 8A and 8B, in some embodiments, the expander module 60 may be mounted onto the internal mounting frame module 20 before being securely connected thereto. Once the expander module is mounted, it can be securely connected to the internal mounting frame module 20 with fastening members (e.g., screws) 802. FIG. 8B illustrates the internal assembly 10 for some embodiments after the expander module 60 has been mounted onto to the internal mounting frame module 20 and secured thereto. In some embodiments, the internal mounting frame module 20 may include a roller 804 with left side and right side end portions rotatably coupled to respective opposite sides of a roller mount 806. The roller 804 and the roller mount 806 can be located at the rear section 12 of the internal mounting frame module 20, such that sheet stock material is guided by the roller 804 into the expander module 60, as will be appreciated by those skilled in the art after reviewing this disclosure.

In various embodiments, the expander module 60 has a rear section 12 and front section 14 and an opening provided therethrough for receiving sheet stock material for expanding the sheet stock material in the expander module 60 before the sheet stock material is pulled through the gears in the gear and motor module 40, as will be appreciated by those skilled in the art after reviewing this disclosure. In some embodiments, the expander module includes a rear section base plate 808, forming a bottom wall leading to a feed entrance of the expander module 60.

Figure 9A:
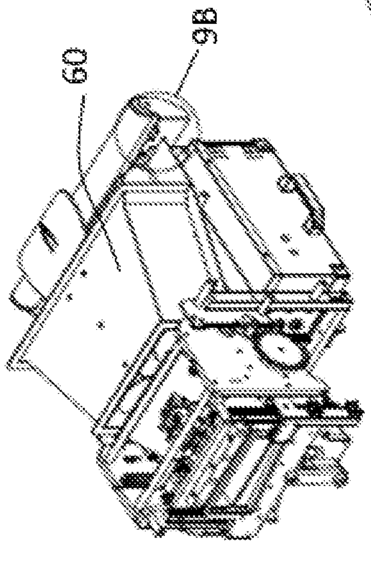
FIG. 9A shows a perspective view of the expander module of FIG. 8B, including the boundary of the region depicted in the enlarged views in FIG. 9B.
Figure 9B:
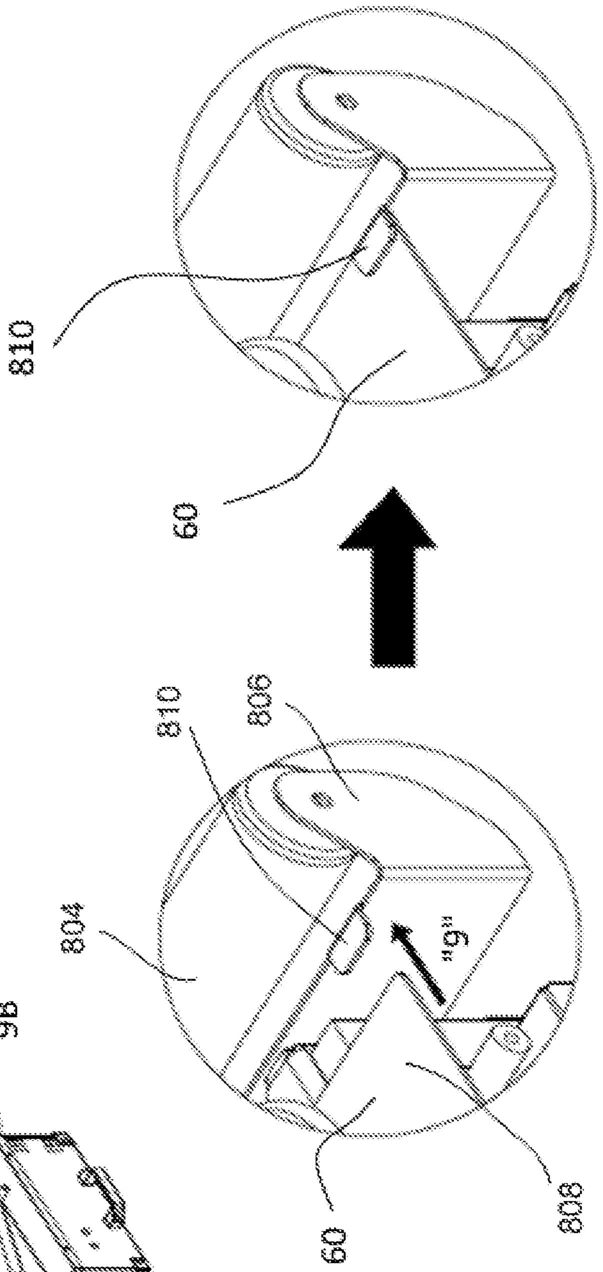
FIG. 9B includes two enlarged perspective views showing motion of the expander module relative to the internal mounting frame module as the expander module is being mounted to the internal mounting frame module.

FIG. 9A mirrors FIG. 8B except further including a boundary region marked by a circle indicating a region shown in enlarged view in FIG. 9B. As previously indicated the internal mounting frame module 20 includes a roller 804 that is coupled to a roller mount 806. Disposed on the roller mount 806 are one or more holding tabs 810 extending forward from the roller mount 806. In some embodiments, in order to mount and secure the expander module 60 to the internal mounting frame module 20, a portion of the bottom base plate 808 of the internal mounting frame module 20 may be slid in the direction of arrow "9" to a location under the one or more holding tabs 810 as illustrated in the right-side drawing in FIG. 9B. In some embodiments, a mounting configuration between the holding tabs 810 and base plate 808 when the expander module 60 is placed atop the internal mounting frame 20 (as shown in FIG. 9A) is such that, the expander module 60 can be slid forward so that the base plate 808 fits snugly beneath the holding tabs 810, with at least some pressured exerted between contact faces between the base plate 808 and holding tabs 810. Thereafter, fastening members 802 can be applied to secure the expander module 60 to the internal mounting frame 20, as will be appreciated by those skilled in the art after reviewing the present disclosure.

Figure 10B:
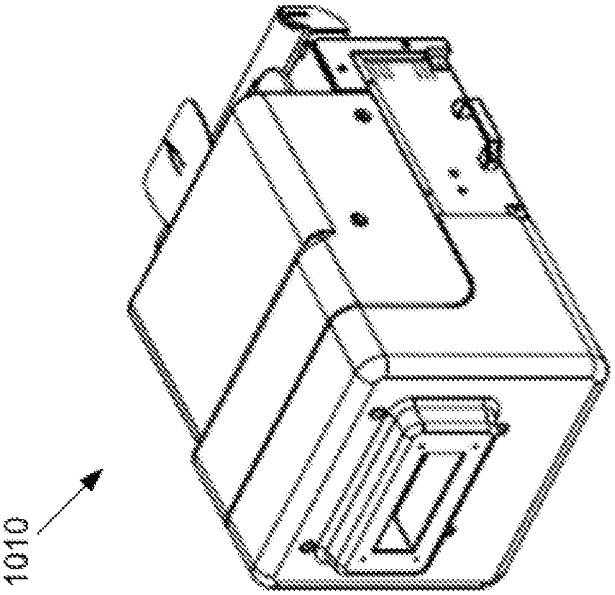
FIG. 10B illustrates the dunnage machine of FIG. 10A in assembled form.
Figure 10A:
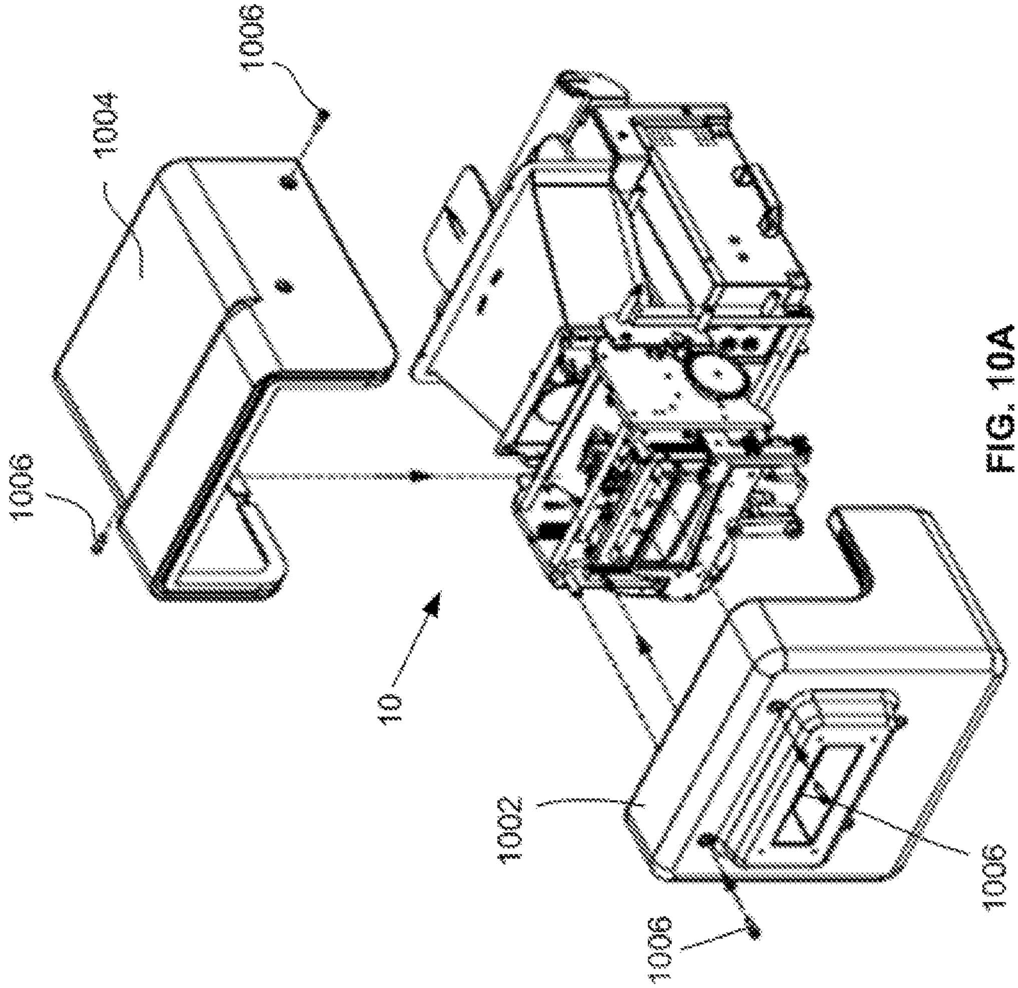
FIG. 10A is a perspective viewing illustrating how a front housing and a top cover housing in some embodiments of the present disclosure are connected to the internal assembly of FIG. 1.

FIG. 10A illustrates examples of how a front housing 1002 and a top cover housing 1004 may be placed onto the internal assembly 10 of FIGS. 1 and 8B. The front housing 1002 and the top cover housing 1004 may be secured to the internal assembly 10 with fastening members (e.g., screws) 1006. FIG. 10B illustrates an assembled dunnage machine 1010 according to some embodiments.

FIGS. 1, 2A, 2B, 3A, 3B, 4A, 4B, 5A, 5B, 6A, 6B, 7A, 7B, 8A, 8B, 9A, 9B, 10A, and 10B, and the above discussion related to the figures are directed to the assembly of a dunnage machine 1010 illustrated in FIG. 10B. However, one of ordinary skill in the relevant art will recognize after reviewing the present disclosure that the assembly process described above may be used as a basis for disassembling the dunnage system 1010 of FIG. 10B by, for example, reversing the operations described above. As noted previously, an example advantage to providing the mounting structures such as, for example, the holding notches, holding studs, stopping studs, holding tabs, in addition to fastening members (e.g., screws), is that during assembly, a module when applicable can be mounted and stabilized so that a user conducting the assembly or disassembly alone, may have both hands free even before fastening members are secured, or after fastening members are removed, without the modules misaligning or otherwise, falling away. This can be particularly useful when the modules (e.g., gear and motor module 40) are relatively heavy.

Figure 11:
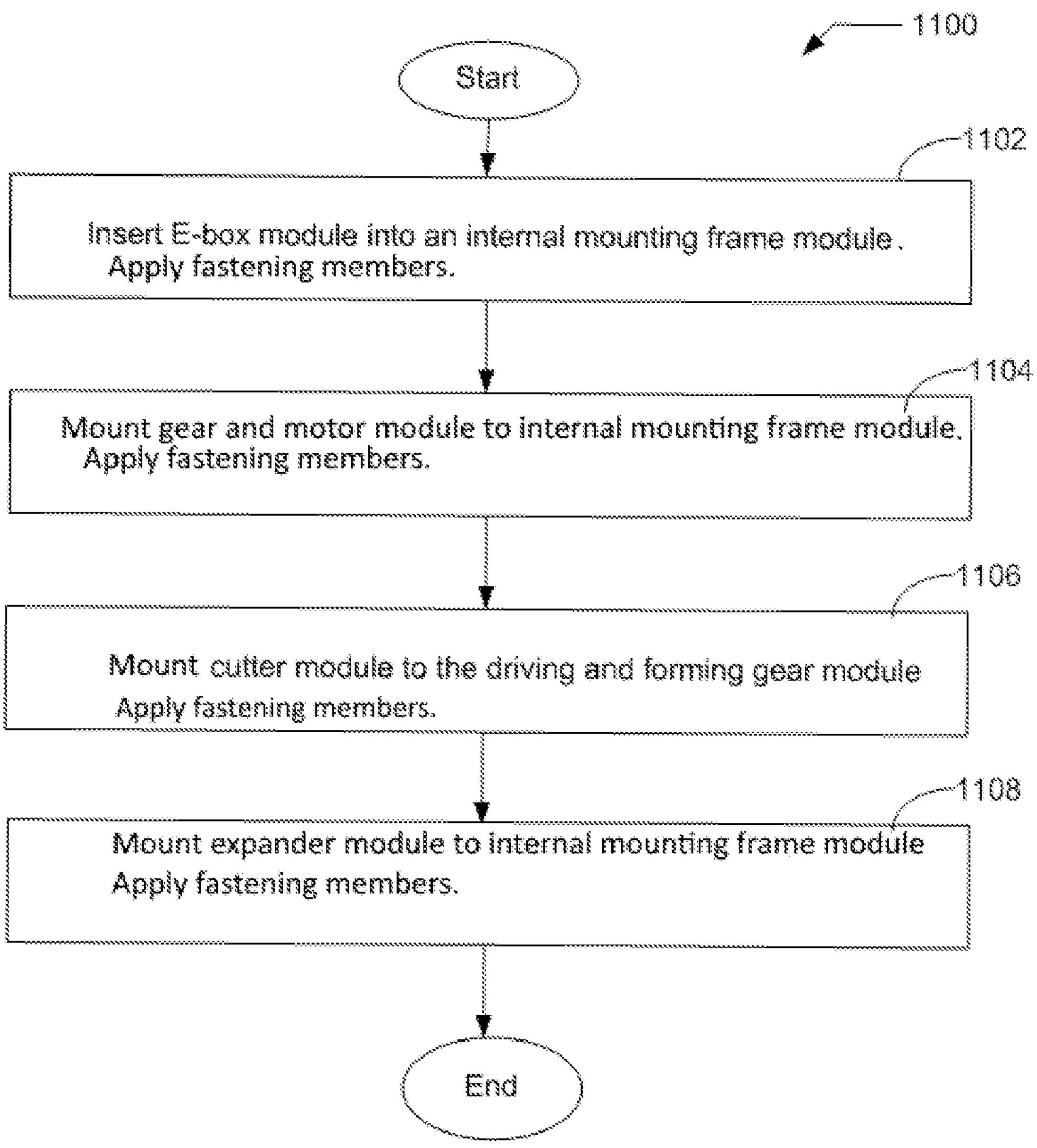
FIG. 11 is an example process for assembling an internal assembly of a dunnage machine of FIG. 1 for some embodiments of the present disclosure.

Turning now to FIG. 11, a process 1100 is illustrated for assembling an internal assembly 10 of a dunnage machine with modular components according to some embodiments.

In some cases, the process 1100 may be implemented using the modules described herein and may begin at 1102 when an E-box module 30 is mounted (inserted/slid) into an interior space of the internal mounting frame module 30. At 1104 a gear and motor module 40 is mounted to the internal mounting frame module 20. In some embodiments, this may be accomplished by hanging the gear and motor module 40 onto the mounting fins 410 of the internal mounting frame module 20. At 1106, a cutter module 50 is attached to the front section of the gear and motor module 40. At 1108, an extender module 60 is mounted onto the internal mounting frame module 20. Also, after each mounting step, fasteners may be immediately applied to secure the module mounted to the module to which it has been mounted.

Note that although process 1100 appears to show various operations being performed in a specific sequence, those having ordinary skill in the art after reviewing the present disclosure will recognize that in various embodiments, one or more of the illustrated operations may be performed in any sequence with respect to the other illustrated operations, or may be performed concurrently. For example, FIG. 11 appears to show that operation 1102 is being performed first before the other operations (e.g., operations 1104, 1106, and/or 1108) are to be performed. However, operation 1102 could be performed concurrently or subsequently to the performance of one or more of the other illustrated operations (e.g., operations 1104, 1106, and/or 1108) in various alternative implementations.

In some embodiments, the dunnage machine 1010, includes all components necessary to expand sheet stock material and process the sheet stock material to form cushioning material or dunnage. That is, aside from a sheet stock supply system to deliver the sheet stock material to the dunnage machine 1010, and a power source supply to the E-box of the dunnage machine, the internal mounting frame module 20, E-box 30, gear and motor module 40, cutter module 50, and expander module 60, can provide essentially of all modules necessary to process sheet stock material within the dunnage machine 1010 to form dunnage (e.g., cushioning material). Thus, in some embodiments, the entire dunnage machine 1010 exhibits traits of portability with easy assembly and disassembly for any component of the dunnage machine 1010 that may need repair and/or replacement. That is, for some disclosed embodiments, there are only five (5) modules, and those modules encompass all parts of the dunnage machine (except the sheet stock supply system if any). Thus, a repair or replacement of any component of the dunnage machine 1010 may comprise simply removing the module 20, 30, 40, 50, 60 within which a component is contained, and repairing the component or shipping the particular module away for repair, while replacing the module with a replacement module 20, 30, 40, 50 or 60, in operative condition. Although the examples illustrate five modules, various embodiments can include a dunnage machine consisting essentially of two or three modules, or up to eight or more modules, which modules still encompass all required mechanical and electrical parts for processing dunnage in a dunnage machine, excluding the sheet stock supply system (e.g., the supply systems can be considered separate from the dunnage machine and part of the dunnage system). In such alternative embodiments, one or more of the modules expressly described above and illustrated in the FIGS. 1-10B, may be divided into separate modules or combined into one module.

The various embodiments described herein, are presented as non-limiting example embodiments of the present disclosure, unless otherwise expressly indicated. After reviewing the present disclosure, an individual of ordinary skill in the art will immediately appreciate that some details and features can be added, removed and/or changed without deviating from the spirit of the disclosure. Reference throughout this specification to "various embodiments," "one embodiment," "an embodiment," "additional embodiment(s)", "alternative embodiments," or "some embodiments," means that a particular feature, structure or characteristic described in connection with the embodiment(s) is included in at least one or some embodiment(s), but not necessarily all embodiments, such that the references do not necessarily refer to the same embodiment (s). Furthermore, the particular features, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

What is claimed is:

1. A dunnage machine assembly comprising:

an internal mounting frame module including at least a pair of mounting fins, and a holding notch disposed atop each of the mounting fins;

a gear module removably mounted to the internal mounting frame, the gear module having at least a pair of opposite mounting sidewalls and a holding stud protruding outwardly from each of the mounting sidewalls, each of the holding studs being positioned on a rearward portion of the gear module, and each of the holding studs being aligned with a corresponding holding notch on one of the mounting fins to hang the gear module from the internal mounting frame module;

an expander module including a top base plate and a bottom base plate, wherein a rear end of the bottom base plate protrudes outwardly in a rearward direction beyond a rear end of the top base plate such that a surface are of the bottom base plate exceeds a surface are of the top base plate, wherein the bottom base plate leads to an entrance of the expander module, wherein the expander module is removably mounted to the internal mounting frame, the expander module being removable from the internal mounting frame separately from the gear module; and wherein a rear facing portion of the gear module abuts against a front frame member of the internal mounting frame module to stop the gear module from pivoting in a rearward direction.

2. The dunnage machine assembly of claim 1, further comprising an electronic box (E-box) module that includes electronic components to provide power to a motor of the gear module, the E-box being slidably mounted and removably connected to the internal mounting frame module.

3. The dunnage machine assembly of claim 1, further comprising a cutter module that includes one or more cutting components to cut a sheet material exiting the gear module, the cutter module being removably connected to the gear module by fastening members.

4. The dunnage machine assembly of claim 1 wherein the at least a pair of opposite mounting sidewalls of the gear module are at least partially disposed between the pair of mounting fins.

5. The dunnage machine assembly of claim 1 further comprising a roller coupled to a roller mount disposed on a rearward portion of the internal mounting frame module, the roller mount including at least one holding tab extending forward of the roller mount, the at least one holding tab being disposed above a surface of the internal mounting frame module.

6. The dunnage machine assembly of claim 5, wherein a portion of the expander module disposed under the at least one holding tab.

7. The dunnage machine assembly of claim 1 wherein the expander module is removably mounted to the internal mounting frame module by being slidably attached to a portion of the internal mounting frame module, such that at least a portion of the expander module is disposed rearward of and extends away from the at least a pair of mounting fins.

8. The dunnage machine assembly of claim 7, wherein the expander module is disposed above the internal mounting frame module.

9. The dunnage machine assembly of claim 1 further comprising a removable cover housing enclosing at least a portion of the internal mounting frame module.

* * * * *